United States Patent [19]
Wilkes et al.

[11] Patent Number: 4,958,488
[45] Date of Patent: Sep. 25, 1990

[54] COMBUSTION SYSTEM

[75] Inventors: Colin Wilkes, Lebanon; Hukam C. Mongia, Carmel; Peter C. Tramm, Indianapolis, all of Ind.

[73] Assignee: General Motors Corporation, Detroit, Mich.

[21] Appl. No.: 339,449

[22] Filed: Apr. 17, 1989

[51] Int. Cl.$^5$ .............................................. F02C 7/00
[52] U.S. Cl. ..................................... 60/39.55; 60/732
[58] Field of Search ............... 60/732, 39.55, 39.05, 60/39.59, 733, 39.57, 39.53

[56] References Cited

U.S. PATENT DOCUMENTS

| | | | |
|---|---|---|---|
| 2,961,050 | 11/1960 | MacCracken | 169/12 |
| 3,359,723 | 12/1967 | Bohensky et al. | 60/39.06 |
| 3,826,077 | 7/1974 | Quigg et al. | 60/732 |
| 4,420,929 | 12/1983 | Jorgensen et al. | 60/39.06 |
| 4,724,780 | 2/1988 | Hoffert et al. | 110/263 |
| 4,784,600 | 11/1988 | Moreno | 431/9 |
| 4,787,208 | 11/1988 | DeCorso | 60/732 |
| 4,845,940 | 7/1989 | Beer | 60/732 |

OTHER PUBLICATIONS

Carlstrom, L. A. et al., "Improved Emissions Performance in Today's Combustion Systems", AEG/SOA 7805, International Seminar, Jun. 1978. pp. 1 and 17.

Primary Examiner—Louis J. Casaregola
Assistant Examiner—Timothy S. Thorpe
Attorney, Agent, or Firm—Saul Schwartz

[57] ABSTRACT

An external combustion system for a stationary gas turbine engine includes a rich zone combustor, a water or steam quench stage, a lean zone combustor and a dilution stage. Fuel such as natural gas or liquid hydrocarbon, which forms no ash or slag, burns in a primary air supply in the rich zone combustor at an equivalence ratio exceeding 1 which inhibits rapid formation of of oxides of nitrogen. The effluent from the rich zone combustor is a stream of combustible gas including carbon monoxide and hydrogen. The combustible gas stream is quenched in the quench stage and mixed with a secondary supply of compressed air in the lean zone combustor. The combustible gas ignites spontaneously in the lean zone combustor and burns at an equivalence ratio of less than 1 and at a temperature below the range characterized by rapid formation of oxides of nitrogen. The discharge from the lean zone combustor is a stream of hot gas motive fluid which is diluted in the dilution stage and introduced into the turbine section of the engine.

2 Claims, 2 Drawing Sheets

COMBUSTION SYSTEM

This invention was made in the course of work under a contract or subcontract of the U.S. Department of Energy.

FIELD OF THE INVENTION

This invention relates to combustion systems for stationary gas turbine engines and, more particularly, to an external combustor which achieves low emissions of oxides of nitrogen and carbon monoxide.

BACKGROUND OF THE INVENTION

U.S. Pat. No. 4,768,446, issued Sept. 6, 1988 to the inventors of this invention and assigned to the assignee of this invention, describes an external combustion system for a stationary gas turbine engine. The described combustion system is particularly suitable for burning pulverized coal and includes a rich zone combustor where the coal is burned at an equivalence ratio above 1 and at a temperature above the slagging temperature of the coal. The combustion products of the rich zone combustor, including combustible gas, molten slag, and ash, pass through a coolant screen which quenches the combustion products. The quenched slag and ash are separated from the combustible gas in two stages of inertial separation. The combustible gas is then introduced into a lean zone combustor with additional combustion air. The combustible gas ignites spontaneously and burns at an equivalence ratio less than 1 to produce a substantially ash-free and slag-free stream of hot gas motive fluid suitable for introduction into the turbine stages of the gas turbine engine. A combustion system according to this invention employs the combustion system of the aforesaid U.S. Pat. No. 4,768,446 without inertial separation stages to achieve low levels of oxides of nitrogen and carbon monoxide with non-slag and non-ash forming fuels such as natural gas or liquid hydrocarbons.

SUMMARY OF THE INVENTION

This invention is a new and improved combustion system particularly suited for stationary gas turbine engines. In the combustion system according to this invention, non-slag or non-ash forming fuel such as natural gas or liquid hydrocarbon is burned in a primary air supply in a rich zone combustor at an equivalence ratio greater than 1. Residence time in the rich zone combustor limits the temperature of the combustion products to a level just below the temperature at which rapid formation of oxides of nitrogen occurs. The effluent from the rich zone combustor includes a combustible mixture of carbon monoxide and hydrogen and is quenched in a curtain of water or steam in a quench stage of the combustion system. The quenched combustible mixture then enters a lean zone combustor where the it spontaneously ignites in a secondary supply of compressed air and burns at an equivalence ratio less than 1. The non-combustible effluent from the lean zone combustor is cooled in a dilution stage of the combustion system and directed to the turbine stages of the gas turbine engine.

DESCRIPTION OF A PREFERRED EMBODIMENT

Figure 1:
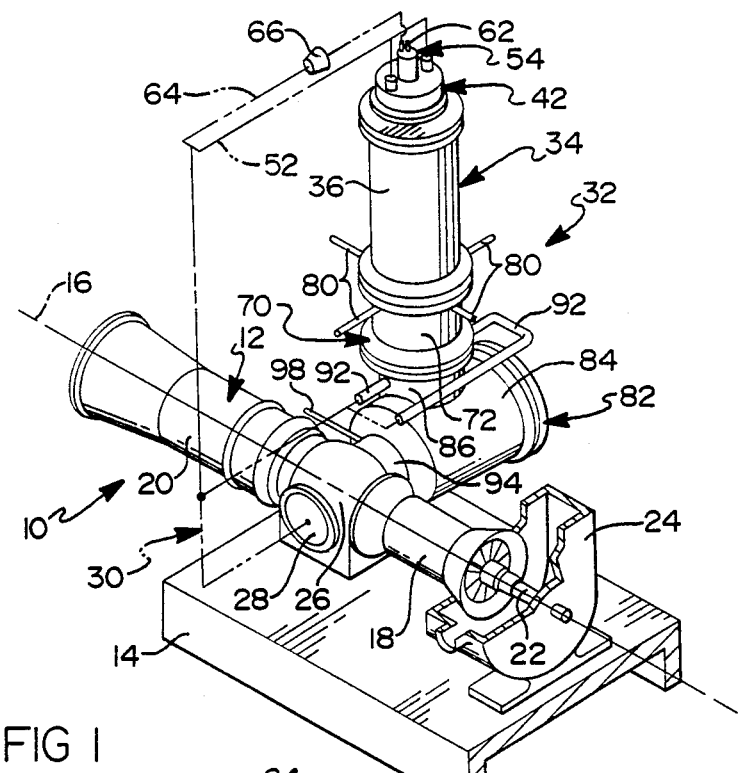
FIG. 1 is partially broken-away, partially schematic perspective view of a gas turbine engine having a combustion system according to this invention.

Referring to FIG. 1 of the drawings, a stationary gas turbine engine 10 includes a generally cylindrical case 12 rigidly mounted on a pedestal 14. The case defines a longitudinal axis 16 of the engine and includes a compressor section 18 and a turbine section 20 within which are rotatably supported, respectively, a plurality of axial flow compressor stages and one or more axial flow turbine stages, not shown. At least one of the turbine stages is connected to an output shaft 22 aligned on the axis 16 of the engine. The output shaft projects from the intake end of the compressor section 18 and through a shroud or inlet duct 24 through which air is conducted to the inlet of the compressor.

The compressor delivers air to a transition section 26 of the engine between the compressor and turbine sections. The transition section is internally constructed to conduct compressed air from the compressor out through a side outlet 28 to a schematically represented transfer duct 30. The transfer duct 30 conducts compressed air to an external combustion system 32 according to this invention. Hot gas motive fluid generated in the combustion system 32 is directed back into the engine through an inlet side of the transition section 26 and from there to the turbine stages in the turbine section 20. With the exception of the combustion system 32 and the transition section 26 associated therewith, examples of suitable stationary gas turbine engines are models 501-K and 571-K gas turbine engines manufactured by Allison Gas Turbine Division, General Motors Corporation, Indianapolis, Ind. 46206.

Figure 2:
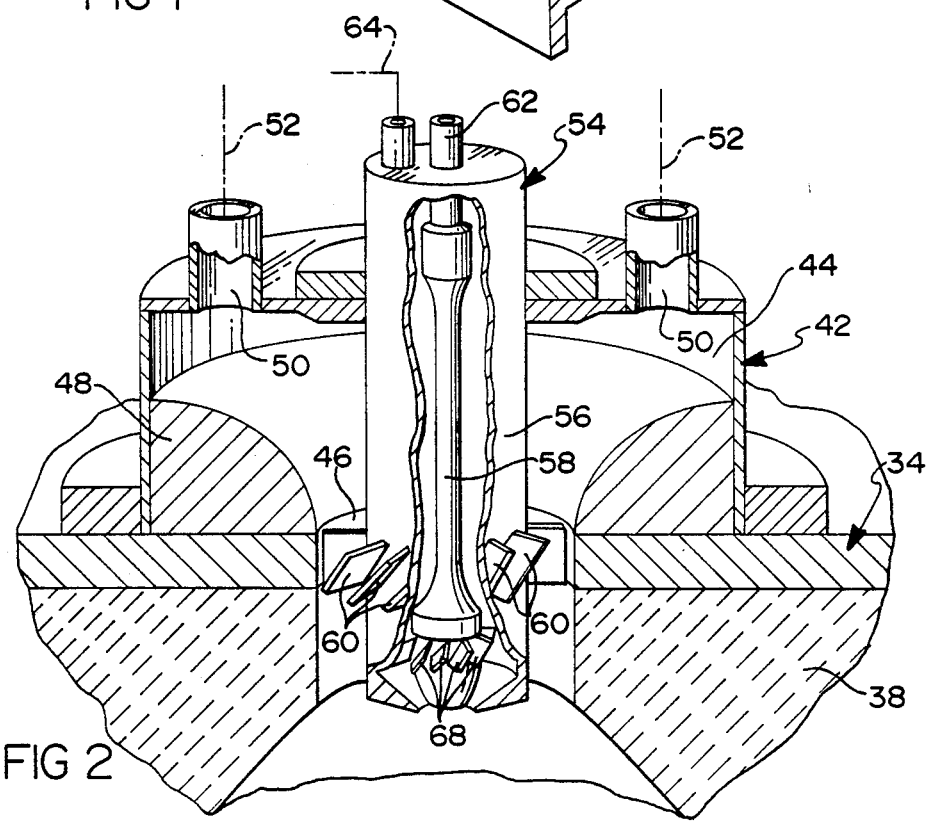
FIG. 2 is an enlarged, partially broken-away perspective view of a portion of FIG. 1.
Figure 3:
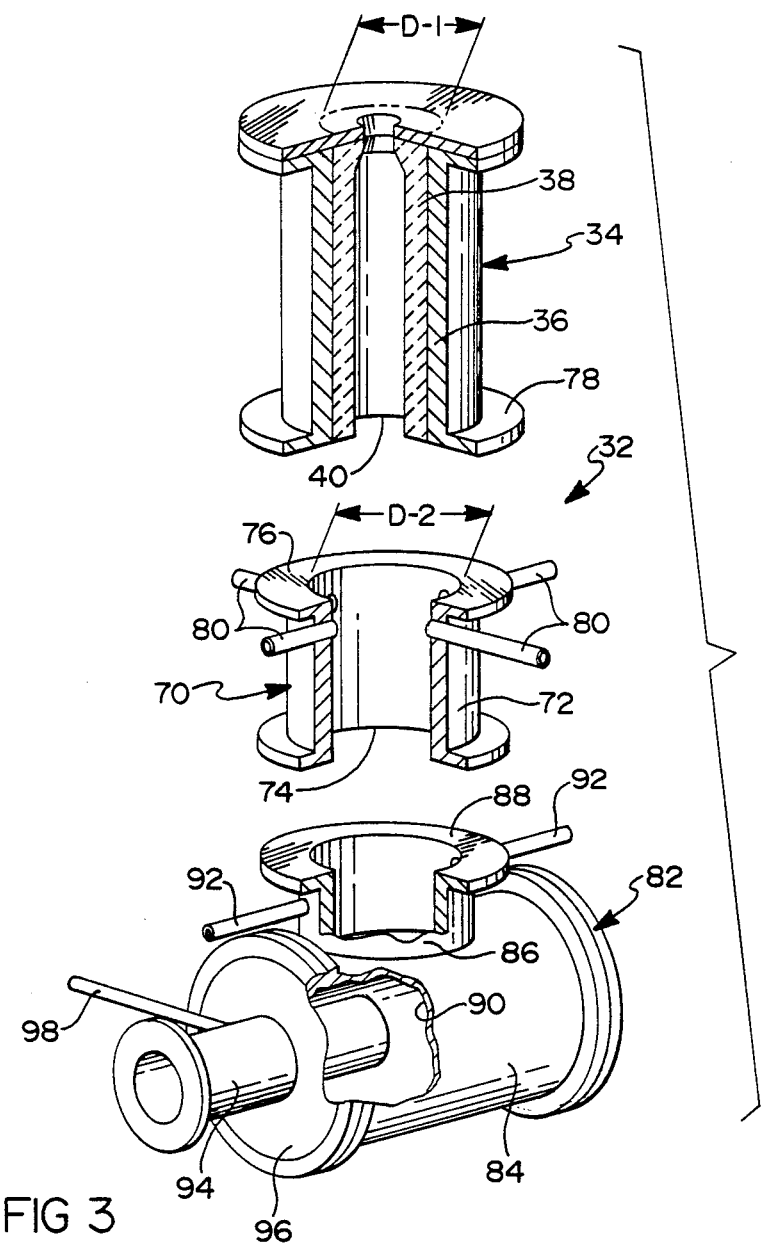
FIG. 3 is an exploded perspective view of a portion of FIG. 1.

As seen best in FIG. 3, the combustion system 32 includes a rich zone combustor 34 having a cylindrical outer shell 36 and a similarly shaped inner shell 38 of high temperature resistant castable refractory. The inner shell 38 has an inside diameter D1 and opens downwardly through a circular opening 40 of the same diameter. An inlet housing 42, FIGS. 1 and 2, on top of the rich zone combustor 34 has an inlet chamber 44 which opens through a circular aperture 46 at the center of a bell mouth 48 into the center of the inner shell 38 of the rich zone combustor. A primary supply of compressed air is conducted into the inlet chamber 44 through a pair of inlets 50 connected to a primary air branch 52 of the transfer duct 30.

A nozzle 54 is centrally mounted on the inlet housing 42 and includes an outer body 56 and an inner body 58 within the outer body. The outer body 56 projects into the aperture 46 and carries a plurality of outside vanes 60 which swirl the primary air flowing from inlet chamber 44 into the rich zone combustor 34. A fuel supply pipe 62 for non-slag and non-ash forming fuel such as natural gas or liquid hydrocarbon fuel is connected to the nozzle inner body 58. The fuel is directed to an orifice, not shown, at the lower end of the inner body centered above the interior of the rich zone combustor 34.

An atomizing air branch 64, FIGS. 1 and 2, of the transfer air duct 30 and is connected to the space between the inner and outer bodies 58 and 56 of the nozzle. The pressure of the atomizing air is boosted by a small, schematically represented atomizing air compressor 66 and flows downward into the rich zone combustor 34 through a plurality of swirl vanes 68 between the inner and outer bodies. The swirling atomizing air mixes with and disperses the non-ash and non-slag forming liquid fuel issuing from the inner body 58. Atomizing air is not required for natural gas fuel. The nozzle 54 is representative and forms no part of this invention.

A quench stage 70 of the combustion system 32 includes a cylindrical housing 72 having a inner wall 74 which defines a throat of the quench stage. The inner wall has a diameter D2 which exceeds diameter D1 of the inner shell 38 of the rich zone combustor 34. The throat may be lined with refractory or the quench stage may be water cooled. A flange 76 on the quench stage provides rigid connection of the latter to a corresponding flange 78 on the rich zone combustor 34. A plurality of coolant supply pipes 80 connect to a corresponding plurality of nozzles on the quench stage adapted to direct horizontal sprays of coolant across the throat of the quench stage. The nozzles are arranged such that a curtain of coolant stretches completely across the throat in a plane perpendicular to the direction of flow of hot gas from the rich zone combustor. A preferable coolant is water but steam or other inert material having a high heat capacity can be employed.

A lean zone combustor 82 of the combustion system 32 is preferably, but not necessarily, of the cyclonic type and includes a cylindrical housing 84 which is closed at both ends. The housing has cylindrical neck 86 with a flange 88 whereat the lean zone combustor is rigidly connected to a corresponding flange on the quench stage 70. The neck 86 opens into the interior of the housing 84 generally tangent to an inside wall 90 thereof which wall also may be lined with a castable refractory. A secondary air branch 92 from the transfer duct 30 supplies a secondary quantity of compressed air to the lean zone combustor through a plurality of air nozzles on the neck 86. The air nozzles may be arranged to increase turbulence in the flow into the lean zone combustor. A cylindrical outlet pipe 94 is supported on an end wall 96 of the housing 84 with an inner end suspended within the housing and an outer end connected to the inlet side of the transition section 26 of the engine.

The outlet pipe 94 has a dilution air branch 98 of the transfer duct 30 connected thereto outside the lean zone combustor 82. The part of the pipe between the lean zone combustor and the transition section 26 of the engine defines a dilution stage of the combustion system 32. The dilution stage is peculiar to the gas turbine application of the combustion system 32 because of limitations on the temperature of the hot gas motive fluid which may be introduced into the turbine stages of the engine. In other applications, the dilution stage could be eliminated and the lean zone combustor connected directly to a downstream consuming device.

The steady state operation of the combustion system 32 is described as follows. The numerical values stated herein are estimates for an engine capable of producing about 6000 horsepower. The compressor of the engine supplies primary air to the inlet chamber 44 at a rate of about 6.3 pounds per second (PPS). Non-ash and non-slag forming fuel such as natural gas issues from the nozzle 54 into the rich zone combustor 34 at a rate of about 0.8 PPS and burns in the primary air and atomizing air from the boost compressor 66 in a fuel rich environment characterized by an equivalence ratio of about 2.0. The rich zone equivalence ratio limits the temperature of the effluent therefrom to about 2800° F. which is below the temperature range characterized by rapid formation of oxides of nitrogen. The effluent from the rich zone combustor 34, which is a combustible mixture of hydrogen and carbon monoxide, flows vertically down through the circular opening 40 in a fast moving, continuous stream.

As the effluent from the rich zone combustor 34 enters the throat of the quench stage 70, it traverses the curtain of water being sprayed by the nozzles at a rate of about 1.5 PPS. Because the diameter D1 of the circular opening 40 in the rich zone combustor 34 is smaller than the diameter D2 of the throat of the quench stage 70, all of the effluent from the rich zone combustor passes through the water curtain which quickly reduces the temperature or quenches the hot combustible gas to about 1800° F.

The quenched combustible gas stream flows into the lean zone combustor 82 at a rate of about 8.6 PPS. A secondary supply of compressed air at a rate of about 8.1 PPS is introduced into the lean zone combustor 82 from the secondary air branch 92 in a fashion to maximize turbulence in the lean zone combustor. The combustible gas from the quench zone ignites spontaneously in the secondary air in the lean zone combustor and burn at an equivalence ratio of about 0.76 so that all of the combustible constituents are consumed in the lean zone combustor. The water or steam from the quench stage functions to limit the temperature rise in the lean zone combustor to below the aforesaid range characterized by rapid formation of oxides of nitrogen. Accordingly, a continuous stream of hot gas motive fluid having acceptably low levels of oxides of nitrogen is discharged into the outlet pipe 94 from the lean zone combustor.

Because the aforesaid gas stream temperature of about 3000° F. is above conventional turbine inlet temperatures, dilution air at a rate of about 15.5 PPS is supplied to the hot gas motive fluid through the dilution air branch 98. Mixture with the cooler dilution air reduces the gas temperature to an acceptable 1970° F. The diluted and cooler motive fluid is directed into the engine through the transition section 26 and then to the turbine stages in the turbine section 20.

The embodiments of the invention in which an exclusive property or privilege is claimed are defined as follows:

1. In combination with a source of compressed air and a source of one of a gaseous and a liquid fuel,
 a combustion system comprising:
   a rich zone combustor, means connecting said rich zone combustor to said source of compressed air and to said source of one of said gaseous and said liquid fuel,
     said fuel being burned in a primary portion of said compressed air in said rich zone combustor at an equivalence ratio exceeding 1 and at on the order of about 2800 degrees F. whereby rapid formation of oxides of nitrogen is inhibited and a continuous stream of combustible hot gas issues from said rich zone combustor,
   a quench stage connected to said rich zone combustor having a throat portion therein receiving said continuous stream of combustible hot gases,
   means on said quench stage defining a curtain of one of water and steam stretching across said throat portion and intercepting all of said continuous stream of combustible hot gas to reduce the temperature of said continuous stream of combustible hot gas from on the order of about 2800 degrees F. entering said quench stage to on the order of about 1900 degrees F. exiting said quench stage, a lean zone combustor connected to said quench stage receiving therefrom the total outflow of said quenched combustible hot gas and to said source of compressed air operative to mix said quenched combustible hot gas and a secondary portion of said compressed air to initiate spontaneous combustion of said quenched combustible hot gas in said lean zone combustor at an equivalent ratio of less than 1, said spontaneous combustion generating a continuous stream of non-combustible hot gas motive fluid at a temperature not exceeding about 3000° F., and duct means connected to said lean zone combustor for transporting said non-combustible hot gas motive fluid to a consuming device.

2. In combination with a source of one of a gaseous fuel and a liquid fuel and a gas turbine engine having a compressor supplying compressed air and a turbine connected to said compressor, an external combustion system for said gas turbine engine comprising:

a rich zone combustor including a generally cylindrical combustion chamber centered on a vertical axis and having a circular discharge from said combustion chamber with a first diameter, means connecting said rich zone combustor to said compressor and to said source of one of said gaseous fuel and said liquid fuel, said one of said gaseous fuel and said liquid fuel being burned in a primary portion of said compressed air in said rich zone combustor at an equivalence ration exceeding 1 and at on the order of about 2800 degrees F. whereby rapid formation of oxides of nitrogen is inhibited and a continuous stream of combustible hot gas issues in a downward direction through said circular discharge, a quench stage connected to said rich zone combustor including a cylindrical throat centered on said vertical axis having a second diameter exceeding said first diameter and receiving the total outflow of said continuous stream of combustible hot gas from said rich zone combustor, a plurality of nozzles on said quench stage connected to a source of water and spraying said water across said cylindrical throat whereby a coolant curtain is defined stretching across said quench stage throat in a plane perpendicular to said vertical axis intercepting said continuous stream of combustible hot gas and reducing the temperature thereof from on the order of about 2800 degrees F. entering said quench stage to on the order of about 1900 degrees F. exiting said quench stage, a lean zone combustor connected to said quench stage and to said source of compressed air operative to mix said quenched combustible hot gas and a secondary portion of said compressed air to initiate spontaneous combustion of said quenched combustible hot gas at an equivalence ratio of less than 1, said spontaneous combustion generating a continuous stream of hot gas motive fluid at a temperature not exceeding about 3000° F., a dilution stage connected to said lean zone combustor and to said compressor receiving and mixing said continuous stream of hot gas motive fluid with a dilution portion of said compressed air to reduce the temperature of said continuous stream of hot gas motive fluid to a predetermined turbine inlet temperature, and duct means connected to said dilution stage for transporting said continuous stream of hot gas motive fluid to said turbine.

* * * * *